United States Patent
Donabedian

(10) Patent No.: US 9,440,683 B1
(45) Date of Patent: Sep. 13, 2016

(54) ROOF PANEL JOINING MECHANISM

(71) Applicant: Ford Global Technologies, LLC, Dearborn, MI (US)

(72) Inventor: Edgar Edward Donabedian, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/817,437

(22) Filed: Aug. 4, 2015

(51) Int. Cl.
*B62D 25/06* (2006.01)
*B62D 25/02* (2006.01)
*B62D 27/02* (2006.01)
*B62D 65/02* (2006.01)

(52) U.S. Cl.
CPC ............. *B62D 27/023* (2013.01); *B62D 25/02* (2013.01); *B62D 25/06* (2013.01); *B62D 65/024* (2013.01)

(58) Field of Classification Search
CPC ...... B62D 25/06; B62D 25/07; B62D 25/02; B62D 27/02; B62D 27/023; B62D 65/02; B62D 65/024
USPC ......... 296/210, 193.12, 187.13, 213, 203.01, 296/203.03, 193.05, 29
See application file for complete search history.

(56) References Cited

U.S. PATENT DOCUMENTS

| | | | |
|---|---|---|---|
| 2,748,645 A | 6/1956 | Peckham et al. | |
| 4,092,766 A | 6/1978 | Meyer | |
| 4,355,845 A * | 10/1982 | Ziegler | B62D 25/06 296/210 |
| 4,475,765 A * | 10/1984 | Vogt | B62D 25/06 296/210 |
| 5,013,083 A | 5/1991 | Yada et al. | |
| 5,237,734 A | 8/1993 | Polon | |
| 5,318,338 A * | 6/1994 | Ikeda | B62D 25/06 296/203.03 |
| 8,915,036 B2 | 12/2014 | Vander Laan et al. | |
| 8,973,809 B2 * | 3/2015 | Hill | B23K 11/115 156/60 |
| 2011/0163571 A1 * | 7/2011 | Furusako | B62D 25/06 296/193.06 |
| 2013/0119647 A1 * | 5/2013 | Tanaka | B62D 25/04 280/730.1 |
| 2013/0328350 A1 * | 12/2013 | Magnusson | B62D 29/048 296/187.02 |
| 2014/0217783 A1 * | 8/2014 | Hida | B62D 25/06 296/210 |
| 2015/0084378 A1 * | 3/2015 | Huhn | B21D 39/021 296/210 |
| 2016/0176274 A1 * | 6/2016 | Lange | B60J 10/0065 296/210 |

FOREIGN PATENT DOCUMENTS

WO 2013153056 A1 10/2013

* cited by examiner

*Primary Examiner* — Gregory Blankenship
(74) *Attorney, Agent, or Firm* — Raymond Coppiellie; Brooks Kushman P.C.

(57) ABSTRACT

A method of assembling a vehicle includes providing a body panel, a roof panel, and a clip. The clip has a central portion extending from a first end to a second end. The central portion has a first surface and a second surface. The clip additionally has a roof-side flange extending from the first surface at the first end and a body-side flange extending from the second surface at the second end. The body-side flange and second surface define a first channel therebetween. The method also includes assembling the clip to the body panel by retaining a portion of the body panel in the first channel. The method additionally includes positioning a portion of the roof panel proximate the first surface. The method further includes forming the roof-side flange toward the first surface to define a second channel with the portion of the roof panel retained in the second channel.

20 Claims, 2 Drawing Sheets

ROOF PANEL JOINING MECHANISM

TECHNICAL FIELD

The present disclosure relates to a roof assembly for an automotive vehicle including a body side panel and a roof panel.

BACKGROUND

Generally, the roof structure of an automotive vehicle includes a roof panel supported by at least one structural member such as a roof rail. At its edges, the roof panel abuts and is joined to body side panels. The body side panels extend along the sides of the vehicle. Conventionally, the roof panel is joined to the body side panel by overlapping edges of the respective panels and using fasteners, such as rivets, to join the panels. Welding may also be used to join adjacent panels.

SUMMARY

A method of assembling a vehicle according to the present disclosure includes providing a body panel, a roof panel, and a clip. The clip has a central portion extending from a first end to a second end. The central portion has a first surface and a second surface. The clip additionally has a roof-side flange extending from the first surface at the first end and a body-side flange extending from the second surface at the second end. The body-side flange and second surface define a first channel therebetween. The method also includes assembling the clip to the body panel by retaining a portion of the body panel in the first channel. The method additionally includes positioning a portion of the roof panel proximate the first surface. The method further includes forming the roof-side flange toward the first surface to define a second channel with the portion of the roof panel retained in the second channel.

According to a first embodiment, forming the roof-side flange toward the first surface includes deflecting the roof-side flange toward the first surface to retain the portion of the roof panel in the second channel using at least one automated forming process.

According to a second embodiment, the body panel has a first raised portion extending in a first direction proximate the clip and the roof panel has a second raised portion extending in the first direction proximate the clip. The first and second raised portions cooperate to define a roof ditch therebetween. In such an embodiment, the method further includes applying a flowable ditch sealant in the ditch.

According to various embodiments, an adhesive may be applied to bond the clip and the roof panel. The clip may be pre-formed with the first channel prior to assembling the clip to the body panel. The clip may be made of metal. Assembling the clip to the body panel may include mechanically engaging the first channel to the body panel. Assembling the clip to the body panel may also include applying an adhesive between the clip and the body panel. The roof-side flange may be integral with the central portion.

A vehicle body panel assembly according to the present disclosure includes a body panel, a roof panel, and a clip. The clip has a central portion extending from a first end to a second end. The central portion has a first surface and a second surface. The clip has a roof-side flange extending from first surface at the first end and a body-side flange extending from the second surface at the second end. The body-side flange and second surface define a first channel therebetween with the body panel retained therein. The roof-side flange and first surface define a second channel therebetween with the roof panel retained therein.

According to various embodiments, an adhesive may be disposed between the roof panel and the second channel. The first channel may be mechanically engaged with the body panel and/or an adhesive may be disposed between the body panel and the first channel. The clip may be made of metal, and the roof-side flange may be integral with the central portion.

A method of assembling a vehicle according to the present disclosure includes providing a side panel, a roof panel, and a clip. The clip has a first retaining portion and a flange extending from the first retaining portion. The method also includes retaining a portion of the side panel within the first retaining portion. The method additionally includes positioning a portion of the roof panel proximate the flange. The method further includes forming the flange toward the first retaining portion to define a second retaining portion. The roof panel is retained within the second retaining portion.

According to a first embodiment, the first retaining portion includes a central portion extending from a first end to a second end and a retaining member coupled to the first end. In such an embodiment, the retaining member and central portion define a first channel therebetween, and the flange is coupled to the second end.

Embodiments according to the present disclosure provide a number of advantages. For example, the present disclosure provides a system for joining vehicle body panels when one side of the joint is inaccessible. Furthermore, the present disclosure provides a method of joining the body panels in an efficient automated fashion.

The above and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
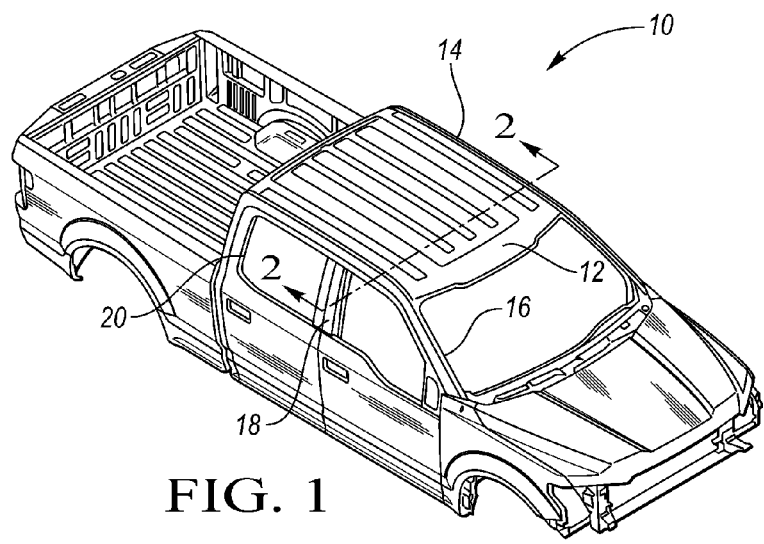
FIG. 1 is an elevation view of a body structure of a vehicle.

Referring to FIG. 1, a vehicle body structure 10 is shown. The body structure 10 is assembled from a plurality of components. A roof panel 12 is generally horizontal and spans over the upper portion of the body structure 10. The roof panel 12 is supported from beneath by body panels 14, which may collectively be referred to as a body side structure, along each opposing lateral edge of the roof panel 12. The body side structure 14 also includes a plurality of generally upright pillars to support the top portion near the roof panel 12. In the example of FIG. 1, a forward A-pillar 16, a mid-cabin B-pillar 18, and a rearward C-pillar 20 are each included as part of the body side structure 14 to support the roof panel 12. While three pillars are depicted by way of example, a vehicle body structure may include more or fewer pillars according to structural and aesthetic requirements. In various additional embodiments, the body structure includes only forward and rearward pillars with no mid-cabin pillar. In further embodiments such as a sport utility vehicle (SUV), a larger passenger cabin may comprise a body structure including four vertical pillars on each side supporting the roof panel.

A number of the panel components of the body structure 10 may be stamped from a sheet metal material. For example, the panels may be formed from a steel alloy sheet material, or an aluminum alloy sheet material. More specifically, component panels of the body structure 10 may be formed from a 6xxx series aluminum alloy.

Conventionally, the roof structure of an automotive vehicle is assembled by overlapping the edges of a body panel and a roof panel, and subsequently joining the panels using fasteners or by welding. However, such joining methods require access to both sides of the joint, i.e. the top surfaces and the bottom surfaces of the respective panels, during the joining process. In some vehicle configurations, structural members, such as roof rails supporting the roof panel, obstruct access to the inner surface of the joint between the body panel and the roof panel. As a result, the use of fasteners or welding may be less desirable.

Figure 2:
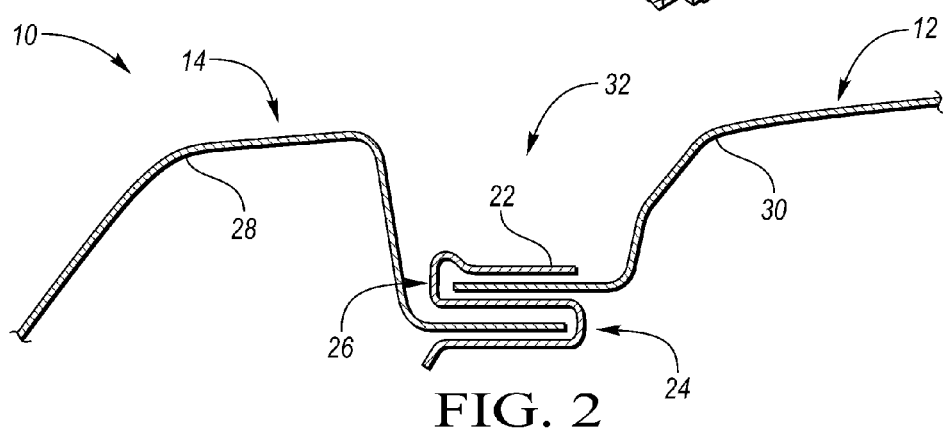
FIG. 2 is a cross sectional front view along a portion of line 2-2 of FIG. 1.

Referring now to FIG. 2, a system for joining the roof panel 12 and a respective body panel 14 is illustrated. In this embodiment, the roof panel 12 is joined to the body panel 14 by a clip 22. The clip 22 includes a first retaining portion 24 retaining the body panel 14 and second retaining portion 26 retaining the roof panel 12. In this embodiment, the clip 22 is generally "S" shaped, and the first retaining portion 24 includes a first channel and the second retaining portion 26 includes a second channel.

A method of joining the roof panel 12, body panel 14, and clip 22 will be discussed below with respect to FIGS. 3A-3D.

The clip 22 is preferably metallic, e.g. formed from a steel alloy sheet material or aluminum alloy sheet material. However, the clip 22 may be formed of any appropriate formable material.

The clip 22 is preferably a unitary piece, e.g. formed as an integral part. However, the clip 22 may include multiple co-operating or joined parts.

The body panel 14 includes a first raised portion 28, and the roof panel 12 includes a second raised portion 30. The first raised portion 28 and second raised portion 30 define a roof ditch 32 therebetween. The roof ditch 32 is configured to carry water from a fore portion of the vehicle to an aft part of the vehicle past the passenger doors. The joint between the roof panel 12 and body panel 14, along with the clip 22, is positioned within the roof ditch 32.

Figure 3A:
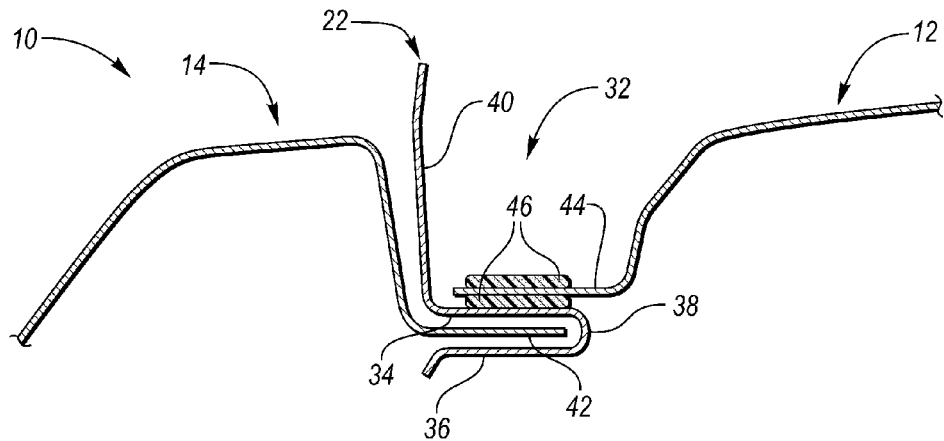
FIGS. 3A-3D illustrate a system and method of joining vehicle body panels according to the present disclosure.

Referring now to FIGS. 3A-3D, a method of assembling the roof panel 12, body panel 14, and clip 22 is shown. As shown in FIG. 3A, the clip 22 includes a central portion 34. The central portion 34 has an upper surface and a lower surface. A first flange 36, which may be referred to as a body-side flange, extends from the lower surface of the central portion 34. The body-side flange 36 is coupled to the central portion 34 by a bend 38, such that the body-side flange 36 and central portion 34 define a first channel therebetween. In a preferred embodiment, the channel is generally "C" shaped. In addition, a second flange 40, which may be referred to as a roof-side flange, extends from the upper surface of the central portion 34. In this embodiment, the body-side flange 36 and the roof-side flange 40 are coupled to opposing ends of the central portion 34.

The clip 22 is assembled to the body panel 14. A peripheral portion 42 of the body panel 14 is retained in the channel between the body-side flange 36 and central portion 34.

In one embodiment, the peripheral portion 42 is mechanically engaged with the channel between the body-side flange 36 and central portion 34. e.g. via crimping or similar methods. In another embodiment, an adhesive is applied between the peripheral portion 42 and the channel. In further embodiments, a combination of adhesive and mechanical joining methods may be used in conjunction with one another.

The roof panel 12 is then positioned proximate the clip 22. A peripheral portion 44 of the roof panel 12 is positioned proximate the upper surface of the central portion 34. In a preferred embodiment, an adhesive 46 is applied to an upper surface and/or a lower surface of the peripheral portion 44.

Figure 3B:
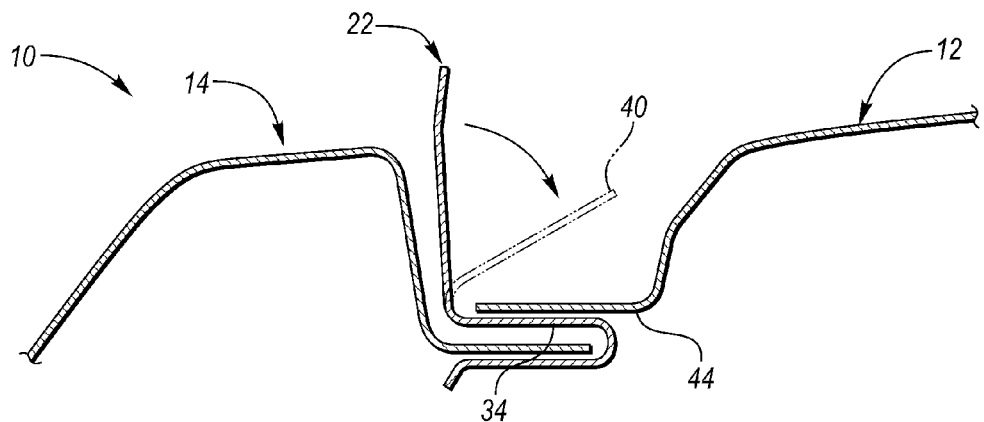

Referring now to FIG. 3B, the roof-side flange 40 is folded toward the upper surface of the central portion 34 with the peripheral portion 44 retained therebetween. In a preferred embodiment, this is performed by an automated machining process, such as an automated wipe process.

Figure 3C:
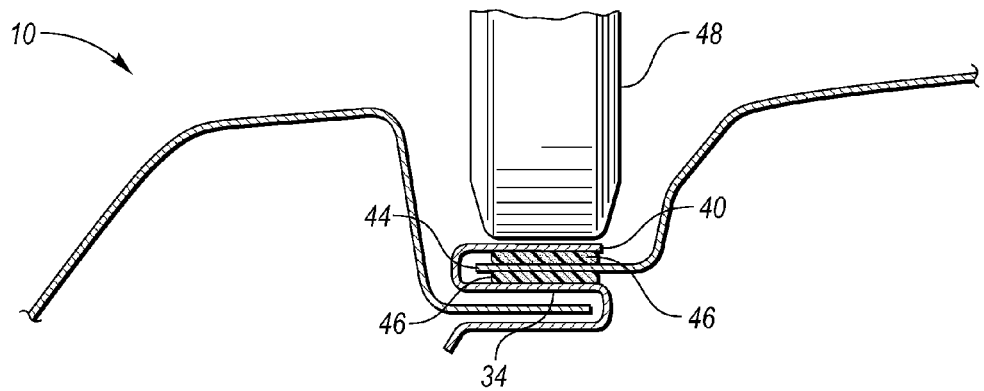

Referring now to FIG. 3C, the roof-side flange 40 is pressed toward the peripheral portion 44. In a preferred embodiment, this is performed by an automated machining process, such as an automated roll process using an automated roller 48. The central portion 34 and roof-side flange 40 form a second channel with the peripheral portion 44 retained therein. The adhesive 46 contacts and joins the roof-side flange 40 and central portion 34 to the peripheral portion 44.

Figure 3D:
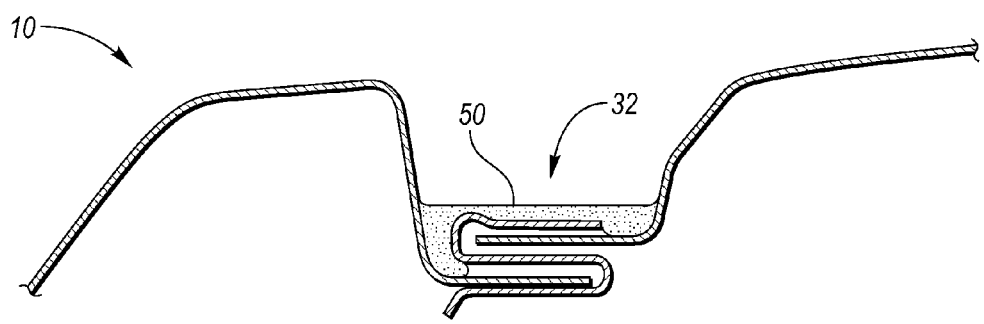

Referring now to FIG. 3D, a sealant 50 is applied to the inner surface of the roof ditch 32. The sealant 50 is preferably a flowable sealant. As a non-limiting example, the sealant 50 may be a vinyl-based self-leveling sealer. Other appropriate sealant materials known to those skilled in the art may, of course, be used. The sealant 50 preferably functions to inhibit penetration of water into the joint between the roof panel 12 and body panel 14.

Variations on the above are contemplated within the scope of the present disclosure. As an example, the roof-side flange may be formed into a final position via a single automated machining process, rather than the two distinct processes described above.

As may be seen, the present disclosure provides various advantages. The present disclosure provides a system for joining vehicle body panels when one side of the joint is inaccessible. Furthermore, the present disclosure provides a method of joining the body panels in an efficient automated fashion.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A method of assembling a vehicle comprising:
   assembling a clip to a body panel, wherein the clip has a central portion defining first and second surfaces and extending from a first end to a second end, a roof-side flange extending from the first surface at the first end, and a body-side flange extending from the second surface at the second end, wherein the body-side flange and second surface define a first channel therebetween, and wherein the assembling includes retaining a portion of the body panel in the first channel;
   positioning a portion of a roof panel proximate the first surface; and
   forming the roof-side flange toward the first surface to define a second channel with the portion of the roof panel retained in the second channel.

2. The method of claim 1, wherein the forming the roof-side flange toward the first surface includes deflecting the roof-side flange toward the first surface to retain the portion of the roof panel in the second channel using at least one automated forming process.

3. The method of claim 1, further comprising applying an adhesive to bond the clip and the roof panel.

4. The method of claim 1, wherein the body panel has a first raised portion extending in a first direction proximate the clip and the roof panel has a second raised portion extending in the first direction proximate the clip, and wherein the first and second raised portions define a roof ditch therebetween, the method further comprising applying a flowable ditch sealant in the ditch.

5. The method of claim 1, wherein the clip is pre-formed with the first channel prior to assembling the clip to the body panel.

6. The method of claim 1, wherein assembling the clip to the body panel includes mechanically engaging the first channel to the body panel.

7. The method of claim 1, wherein assembling the clip to the body panel includes applying an adhesive between the clip and the body panel.

8. The method of claim 1, wherein the clip is made of metal.

9. The method of claim 1, wherein the roof-side flange is integral with the central portion.

10. A vehicle body panel assembly comprising:
    a body panel;
    a roof panel; and
    a clip having a central portion extending from a first end to a second end, the central portion having a first surface and a second surface, the clip having a roof-side flange extending from first surface at the first end and a body-side flange extending from the second surface at the second end, the body-side flange and second surface defining a first channel therebetween with the body panel retained therein, the roof-side flange and first surface defining a second channel therebetween with the roof panel retained therein.

11. The assembly of claim 10, further comprising an adhesive disposed between the roof panel and the second channel.

12. The assembly of claim 10, wherein the first channel is mechanically engaged with the body panel.

13. The assembly of claim 10, further comprising an adhesive disposed between the body panel and the first channel.

14. The assembly of claim 10, wherein the clip is made of metal.

15. The assembly of claim 10, wherein the roof-side flange is integral with the central portion.

16. A method of assembling a vehicle comprising:
    retaining a portion of a side panel within a first retaining portion of a clip;
    positioning a portion of a roof panel proximate a flange extending from the first retaining portion; and
    forming the flange toward the first retaining portion to define a second retaining portion and retain the roof panel therein.

17. The method of claim 16, wherein the first retaining portion includes a central portion extending from a first end to a second end and a retaining member coupled to the first end, wherein the retaining member and central portion define a first channel therebetween, and wherein the flange is coupled to the second end.

18. The method of claim 16, wherein the forming includes deflecting the flange using at least one automated forming process.

19. The method of claim 16, further comprising applying an adhesive between the roof panel and the flange.

20. The method of claim 16, wherein the side panel has a first raised portion extending in a first direction proximate the clip and the roof panel has a second raised portion extending in the first direction proximate the clip, and wherein the first and second raised portions define a roof ditch therebetween, the method further comprising applying a flowable ditch sealant in the ditch.

* * * * *